United States Patent Office 3,669,756
Patented June 13, 1972

3,669,756
VEHICLE COUPLING WEIGHING DEVICE
Richard S. Bradley, Fairmont, Minn., assignor to Art's-Way Manufacturing Company Incorporated, Armstrong, Iowa
Original application July 2, 1969, Ser. No. 838,438. Divided and this application Oct. 29, 1971, Ser. No. 193,929
Int. Cl. G01g 19/08
U.S. Cl. 177—136           12 Claims

ABSTRACT OF THE DISCLOSURE

An electromechanical weight-measuring system for weighing successive and cumulative loads deposited in a load-receiving medium employs a plurality of elastic deformable elements supporting the receiving medium at a plurality of predetermined load points. The elastic deformable elements are each positioned intermediately of a load point and a related ground-engaging supporting unit and each has affixed thereto an electrical strain gage medium interconnected in a circuit for amplifying and indicating changes in the weight imposed upon the receiving medium. The invention of this divisional application employs, in addition to a plurality of ground-engaging support means interconnected by the elastic elements with the receiving medium, a second ground-engaging supporting unit having an above ground support connection element together with a weight-responsive coupling device interconnecting said last-mentioned support connection element with one of the crucial load points of the receiving medium, said coupling device comprising a substantially horizontal, elastic weight-bendable member having one of its end portions connected to said last-mentioned support connection element and having another end connected and affixed to partially support said receiving medium. One of said connections of said deformable coupling elements is mounted for oscillation on a substantially horizontal axis extending longitudinally thereof. Electrical strain gage means is mounted on said deformable elastic member and is interconnected with the electrical circuitry of the strain gages of said other units to interpose as a factor in measurement of overall load weight that proportion of weight superimposed on said coupling.

---

This application is a divisional of applicant's original application Ser. No. 838,438, filed July 2, 1969, entitled "Strain Gage Weighing Device," and relates particularly to the invention and combinations of the invention illustrated in FIGS. 1B, 4 and 5 of the original application. This invention relates particularly to unitary load-factor electromechanical devices which coordinate with and form a part of many embodiments of applicant's original disclosure.

This invention relates to systems and devices for accurately weighing successive and cumulative loads deposited in a material-receiving medium, container, or hopper, which is supported at one or more load points, and more particularly this invention relates to devices and systems used for weighing utilizing resistance type strain gages as sensors which are bonded to load bearing elements of a resilient, cantilevered type, and is particularly applicable to storage type material-receiving media, as well as vehicular mounted storage and mixing containers.

BACKGROUND OF THE INVENTION

The apparatus of this invention was developed specifically to meet the needs of the farming industry. In meeting the difficult requirements of this market the device also meets the less critical needs of many other applicantions.

A primary need of the farmer is for a low cost weight measuring device which may be factory or field installed on portable grain feed mixers and mills. The device has to be capable of operation from nominal 12 v. D.C. automotive type electrical systems. Feed mixes often contain relatively small proportions of antibiotics and vitamins. Therefore, the apparatus must be capable of accurately measuring a wide range of weights. The weighing mechanism must be rugged and capable of sustaining travel over rough terrain without damage. An unusual requirement is that accuracy of measurement be maintained on grades and uneven ground. The apparatus must be capable of operating over a temperature range of −22° F. to +140° F. under conditions of 100% humidity, since these are the typical conditions which the equipment will be subjected to in normal use.

Various weighting devices are available on the market which utilize a strain gage technique for measuring the weight or amount of material received by the material-receiving media. Certain devices presently in use contain a load-cell sensing device located between the receiving container and auxiliary structures requiring the sensing device to be a main support member and frequently requiring the incorporating of duplicate structures such as an additional frame in order to provide adequate mechanical support. Modification of presently existing vehicles to incorporate a load cell weight-measuring system would be impractical. The present invention utilizes the load-bearing members of the vehicle as originally constructed and does not of itself carry any of the weight being measured and may be readily adapted to vehicles which are presently in use. Incorporating the presently described weight-measuring device to fixed storage containers also is readily achievable.

Present weighing systems are incapable of maintaining a high degree of accuracy when measuring the weight of material in a vehicle-mounted container. The terrain upon which the vehicle is mounted continually introduces an error in the reading obtained. Irregularities, such as crevices or rocks, appearing beneath the wheels cause a different fulcrum point to occur thereby introducing undesirable errors. The present invention utlizes a technique for measurement which is independent of the mounting surface upon which the vehicle or storage container rests. The present invention also provides a simple, economical and highly accurate system for electro-mechanically weighing successive and cumulative loads deposited in a material-receiving container which may be mounted for travel on a plurality of ground-engaging elements such as wheels, and in addition is applicable to stationary storage media such as bins and elevators where the receiving medium is supported on one or preferably a plurality of cantilevered, resilient, load-receiving elements which support the load being measured. More specifically, this invention describes a weight-measuring system which incorporates a strain gage sensing element located in each of the load points involved and is not limited to cantilever-type supports.

In the preferred embodiment, a pair of electrical resistance strain gages are embedded or affixed in each load member. A second pair of sensing strain gages is affixed to the load member a prescribed distance from the first pair, each pair having one unit mounted above and the second unit mounted below the load-bearing member in juxtaposition. The upper strain gages are capable of measuring compression and the lower strain gages measuring the tension occurring on the slightly deformed load-bearing elements. The sensors are electrically connected together to form a bridge circuit employing a null-type indicating means, suitable amplification, a means of balancing the initial or start position, a second means for successively balancing out incremental loads, and a mechanically actuated counter for indicating successive and cumulative weights of material loaded into the material-receiving medium.

The present invention utilizes microminiature integrated circuitry which, for convenience, is housed in a remotely located housing with the indicating and nulling means. It is especially adapted for use on load-carrying vehicles of various types, since the only requirement for immediate installation is a substitution of a replaceable axle and axle mounting plate without the requirement of modifying the vehicle wheels or other ground supporting means.

The object of this invention is to provide an electromechanical weight-measuring system which is readily adaptable to vehicular material-receiving mediums as well as those of the stationary type.

Another object of this invention is to provide an electromechanical weight-measuring system which is suitable for use with a vehicular mounted, material-receiving medium, and is capable of maintaining a high degree of accuracy regardless of the terrain on which the vehicle is mounted.

A further object of this invention is to provide an electromechanical weight-measuring system which is small in size, light in weight, and utilizes a remotely located indicating device which may be alternately utilized in combination with a multiplicity of load-carrying vehicles or stationary media.

A further object of this invention is to provide an electromechanical, weight-measuring system which will accurately weigh the amount of material contained in a storage media which is independent of the number of load-bearing support members.

Additional objects and advantages will be more fully understood from the following description made in connection with the accompanying drawings wherein like reference characters refer to similar parts and in which.

Figure 1:
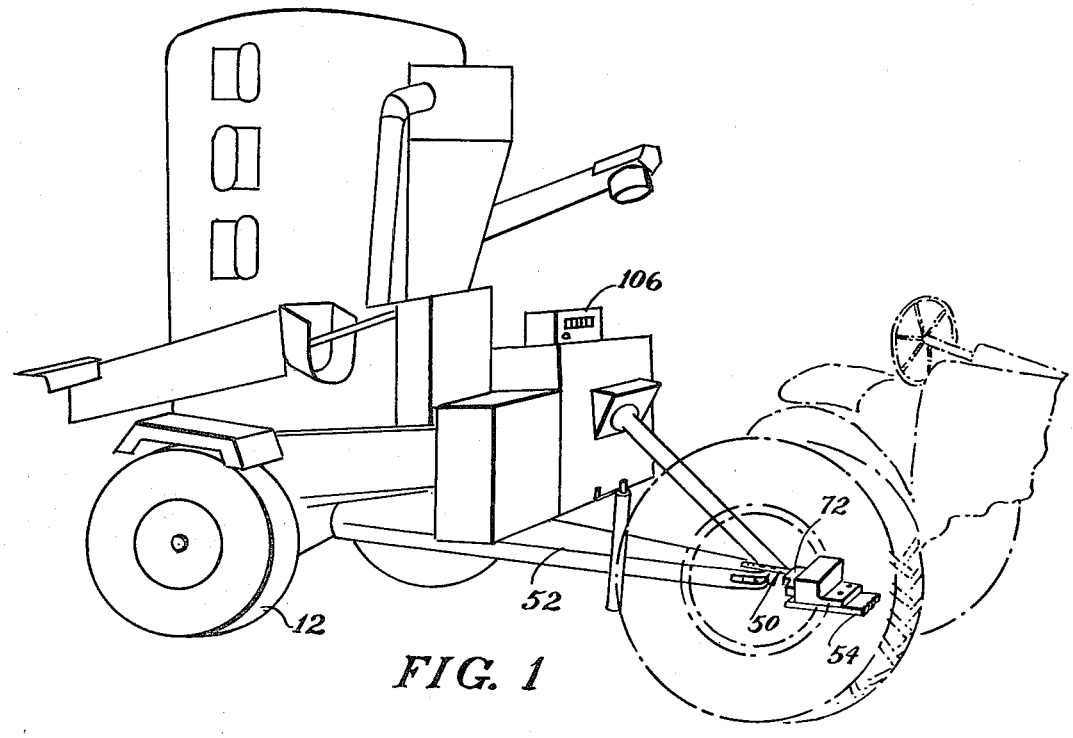
FIG. 1 is a perspective view of a typical, sulky-type feed mixer drawn by a tractor.

In FIG. 1 there is shown a perspective of a typical sulky-type two-wheel feed mixer and hopper drawn by a tractor, a portion of which is shown.

Figure 1A:
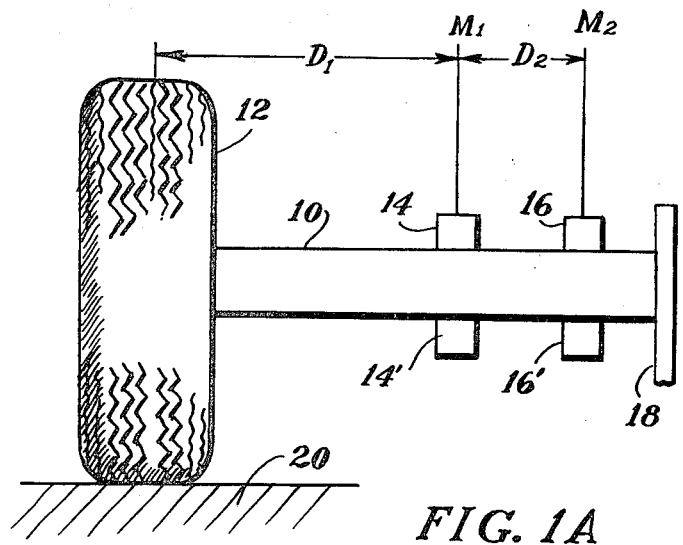
FIG. 1A is a force diagram showing the moments which occur on the cantilevered axle supporting the feed mixer of FIG. 1.

To better understand the principle of operation of my electromechanical weight-measuring system, reference is made to FIG. 1A wherein there is shown an axle 10 supported by wheel 12. Mounted on the axle are two strain gage devices 14 and 16. As FIG. 1A indicates, the load P being applied to the support plate 18 causes reaction W from the earth 20 against tire 12. The distance from strain gage 14 to the load reaction point W is to be considered $D_1$. The distance between strain gages 14 and 16 is to be considered as $D_2$. The moments caused by the reaction W about the strain gages can be computed as follows: The moment at strain gage 14 is $M_1 = Wx(D_1)$. The moment at strain gage 16 is $M_2 = Wx(D_1+D_2)$. The difference of the two moments between strain gages 14 and 16 is therefore $$M_2 - M_1 = WxD_1 + WxD_2 - WxD_1$$

therefore $M_2 - M_1 = WxD_2$.

It has thus been shown that if the distance $D_2$ remains fixed, the applied load P of an object is directly proportional to the difference in the moments read at gages 16 and 14 and is independent of $D_1$. Therefore it matters not where along the axle or wheel the reaction load is exerted. This principle is applied in my strain gage weight device.

In order to increase the effective output of the strain gages and to provide temperature compensation when connected in a Wheatstone bridge, two pairs of gages are utilized rather than only two units. A first strain gage 16 and a second strain gage 14 appearing on the top of the axle 10 would be normally found to be in compression, as indicated in FIGS. 1 and 1A, and therefore would be caused to have a resistance value decreasing in magnitude and directly dependent on the weight W applied.

Two additional strain gages 14' and 16' are mounted on the underside of axle 10 in juxtaposition with gages 14 and 16, respectively. Strain gages 14' and 16' will be found to be in tension when gages 14 and 16 are in compression. In order to provide the physical subtraction as the mathematics indicate, all that need be done is that strain gage 16' be connected in series with strain gage 16 in the proper arm of the bridge to obtain the correct result. This will be further explained in greater detail hereinafter.

Referring now to FIGS. 2–5, inclusive, an embodiment of my invention as applied to vehicular material-receiving media such as feed mixers, farm wagons, combines, track-propelled material-receiving implements and sleds, requires a very rigid axle mounting structure 10 having, as shown, a heavy mounting plate 18 secured in a vertical position by suitable securing means such as a plurality of bolts 20 to the material-receiving medium (hopper, tank or bin) 22, of the vehicle body. Many of the farm wagons, mixers or other implements have axles which at their outer end carry rotatably ground-engaging wheels or the like. The embodiment of my structure illustrated in FIG. 2 includes an axle 10 which is rigidly welded or otherwise affixed to the plate 18, which is of heavy metallic material not readily flexible or being able to resiliently bend with the maximum weight or loads of material to be applied.

Strain gages 14 and 16 and 14' and 16' are connected by means of cable 26 to plug 28. Plug 28 is connected to the remote indicating means 106 which will be explained a little later. In the present embodiment, provisions have been made to incorporate four load-sensing points, as for example, in a four-wheel vehicle. For a two or three-wheel vehicle where less than four points are to be utilized, a dummy sensor is used in order to effect the proper balancing of the bridge. In this manner, one or more load points may be sensed. The only requirement is that if all four sensors are not being utilized a dummy be substituted in the position. Additional sensing gages may be incorporated in the balanced bridge arrangement if it becomes necessary for a particular application.

Figure 1B:
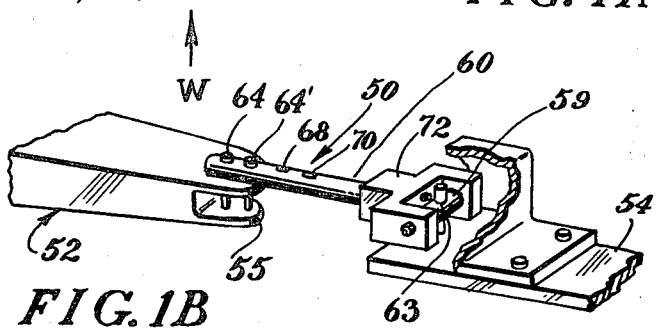
FIG. 1B is a perspective view of a load measuring hitch for use with a sulky type container.
Figure 3:
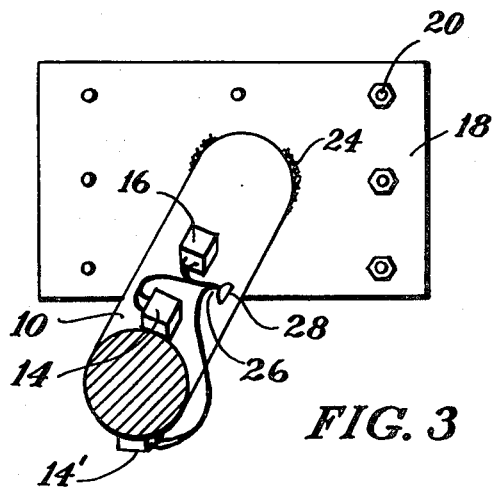
FIG. 3 is an isometric view of the axle taken along line 3—3 showing the location of the strain gages and method of attachment to the mounting plate.
Figure 2:
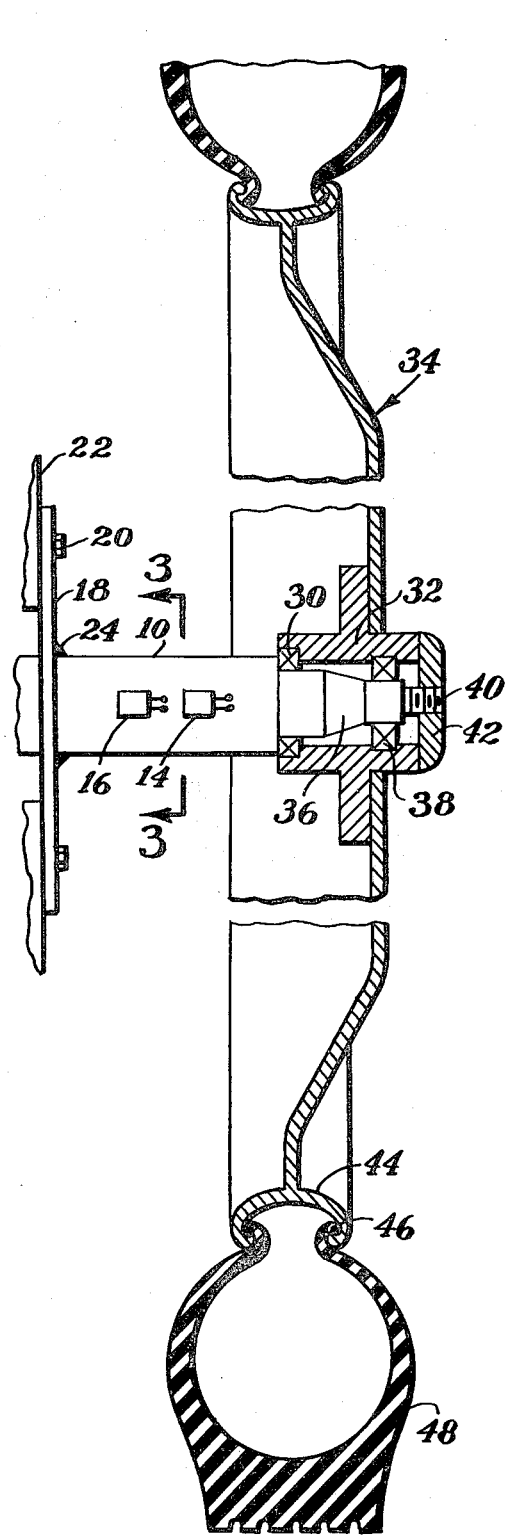
FIG. 2 is a top plan view of a substitute axle and axle support rigidly secured to a material-receiving vehicle with the wheel thereof shown in horizontal cross section and showing a pair of strain gage sensors bonded or embedded in the top portion of the axle, with the axle in cantilevered relation relative to its support and the wheel.
Figure 4:
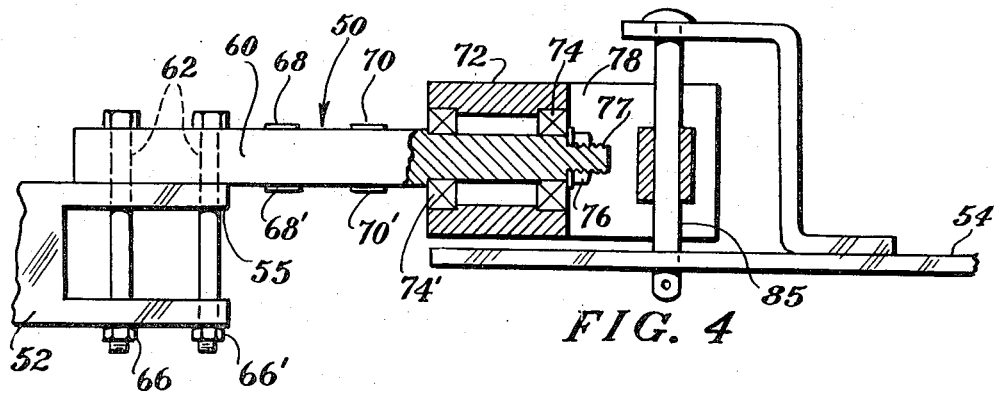
FIG. 4 is a partially sectioned side elevational view of an intermediate hitch for coupling a sulky-type two-wheel vehicle to a tractor.
Figure 5:
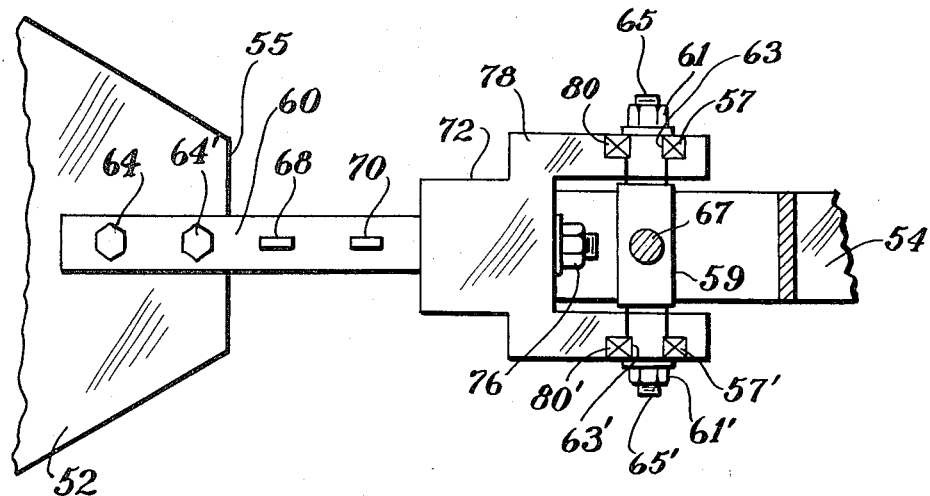
FIG. 5 is a top plan view of the intermediate hitch of FIG. 4.

The present embodiment of my invention includes the axle 10 rigidly mounted to plate 18 which constitutes the fulcrum as described earlier. Axle 10 extends from the fulcrum 18 throughout a predetermined length to a bearing 30 for rotatively receiving the hub 32 of a conventional wheel 34. The outer portion of axle 10, beyond the bearing 30, is reduced conventionally at 36 and the second bearing 38 is provided. The terminus 40 of the axle 10 is threaded for engagement with an internally threaded hub cap 42. The wheel 34 has the conventional type of rim 44 which has bead-engaging portions 46 for attachment to a conventional type of pneumatic, or otherwise inflatable tire 48. The extended portion of axle 10 beyond the fulcrum end of mounting plate 18 constitutes a cantilevered unit when the body or material-receiving medium is supported upon the wheels 48. At a predetermined area of the exposed portion of the axle 10 strain gages 14 and 16 are bonded to the axle extending essentially in a horizontal plane and having their leads, as shown in FIG. 3, attached respectively to insulated electrical conductor means of cable 26 to electrical connector 28. Similar strain gage elements 14' and 16' are bonded ot the underside of the stationary axle 10 directly opposing the top strain gages 14 and 16, as shown in FIG. 1. The electrical circuitry including the four strain gages and similar and correspondingly mounted strain gages on the axially aligned and opposite supporting axle of the vehicle is illustrated in the electrical diagrams of FIGS. 6 and 7. Strain gages 14 and 16 and 14' and 16' are a commercially available unit which are manufactured by deposition and etching techniques on an insulated substrate. It will be understood that if a four-wheel vehicle or sled, or a multiwheel vehicle or track-type vehicle is provided with my electromechanical weighing system, then corresponding sets of strain gages and leads are employed for all load points. As contemplated in FIGS. 1, 2 and 3, a sulky-type vehicle is employed having two wheels 34 with special replacement axles 10 and mounting plates 18 axially aligned on the vehicle body. In such instance, an intermediate draft tongue, indicated as an entirety by the numeral 50 as shown in FIGS. 1B, 4 and 5, is employed at the front end of the sulky vehicle to connect the structure of the sulky 52 with a tongue or drawbar 54 provided by a tractor or other draft vehicle.

The preferred embodiment of the intermediate hitch 50 comprises a weight-measuring member 60 having holes 62 therein at one end which allows the insertion of bolts 64. The hitch 50 is then rigidly connected to the sulky tongue 55 with the aid of bolts 64 and 64' and nuts 66 and 66'.

Rigidly affixed to the weight-measuring member 60 on the upper surface are strain gages 68 and 70, while gages 68' and 70' are rigidly mounted on the lower surface. The opposite end of member 60 has a smaller diameter and is rotatably mounted in housing 72 within bearings 74 and 74' and is held in position by tightening nut 76 onto the threaded end 77 of member 60.

Extending from the housing structure 72 is a clevis structure 78 comprising a pair of vertical plates having bores 80 and 80' for receiving mounting bearings 57 and 57' therein. Crossbar 59 has cylindrical end portions 63 and 63' rotatably mounted in said bearings 57 and 57'. Nuts 61 and 61' are secured to mating threaded portions 65 and 65' and hold cross bar 60 in place. A mounting hole 67 is provided in cross bar 59. The cross bar is secured to the clevis 54 of a tractor or other towing vehicle by means of a king pin 85 which fits through the hole in the tractor clevis 54 and the hole 67 in the hitch cross bar 59.

The purpose of the bearings 74, 74' in the hitch 50 is to prevent the application of unwanted torques or moments upon the sulky vehicle which may be imposed by the tractor if it is tilted with respect to the sulky, e.g., the wheels of the tractor and sulky not being in the same or parallel planes. When this occurs a twisting action takes place between the tractor clevis 54 and the hitch 50. If bearings 74 and 74' were not used a torsion shear stress would occur in the weight-measuring member 60 producing a false weight indication.

The strain gages 68 and 70 and 68' and 70' are disposed on the round weight-measuring member 60 in exactly the same manner and for the same reasons as previously explained for the axles. Bending moments in the weight-measuring member 60 are sensed and interpreted in the same manner as described for the axle device.

Figure 6:
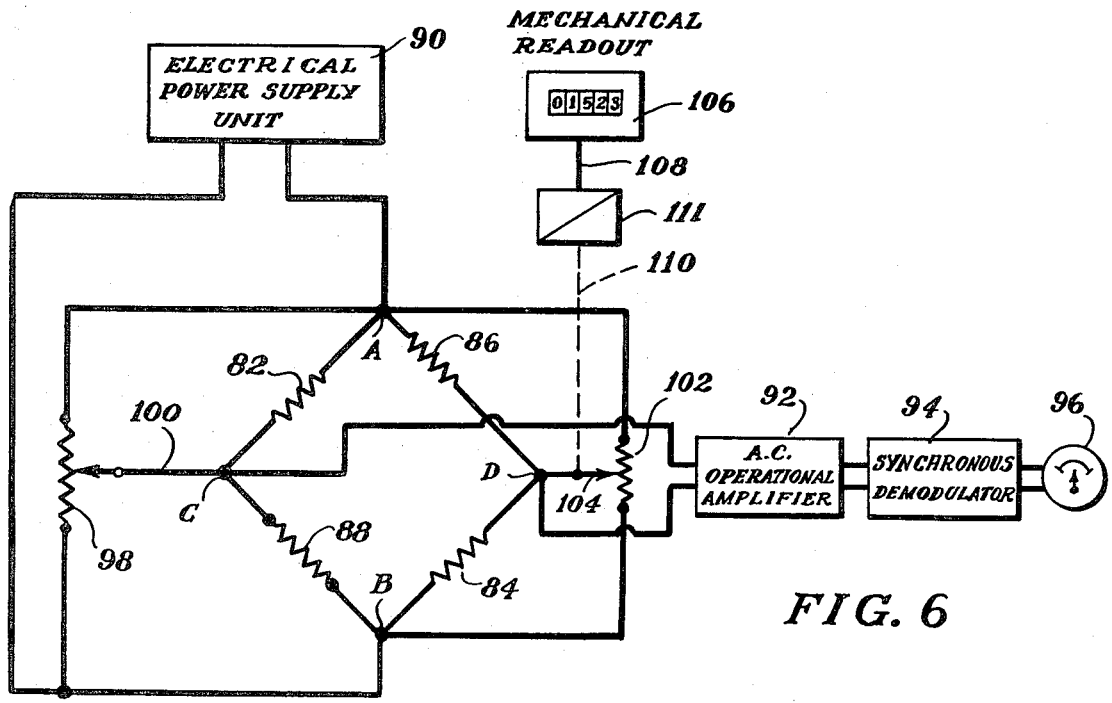
FIG. 6 is a schematic diagram of one embodiment of my electromechanical weight-measuring system.

Referring now to FIG. 6, in the bridge circuit a load-measuring transducer or sensor of the resistance type is employed. It is commonly known that the electrical resistance of this type of strain gage is increased when the gage is under tension and decreased when the gage is under longitudinal compression. A strain gage bonded to the top of a resonant or elastically, deformable cantilevered weight-supporting member, will be under increasing compression as the weight is increased and a strain gage bonded to the bottom of a deformable cantilevered weight-supporting member, will be under increasing compression as the weight is increased and a strain gage bonded to the bottom of a second deformable cantilevered weight-supporting member will be under increased tension as the weight is increased. For convenience hereafter, the strain gages subjected to compression as the load increases will be referred to as "compression gages" and the strain gages subjected to tension as the load increases will be referred to as "tension gages." The gages bonded to the lefthand deformable member will be referred to as "left" compression and tension gages and the gages bonded to the righthand deformable member will be referred to as "right" compression and tension gages.

In describing the electrical connections, the four corners of the bridge circuit are respectively identified as points A, B, C and D. The diagram of FIG. 6 illustrates the electrical components of a system having two centilevered weight-supporting members. The left compression gage 82 is connected between points A and C to form an arm of the bridge circuit and the right compression gage 84 is connected between points B and D to form the second arm of the bridge circuit opposite the first-mentioned arm. The right tension gage 86 is connected between points A and D to form a third arm of the bridge circuit and the left tension gage 88 is connected between points B and C to form a fourth arm of the bridge circuit opposite the third arm.

A source of alternating voltage is connected across points A and B of the bridge circuit which provides a potential difference between points A and B. In the present embodiment, the source of alternating voltage is obtained from the D.C. vehicle battery and is changed into an A.C. square wave by a conventional inverter circuit 90. In addition, secondary inverter outputs are rectified and filtered by conventional means and regulated by the use of Zener diodes in a conventional manner to generate the auxiliary D.C. voltages. These voltages remain at a fixed value regardless of the battery potential, and are required for the operation of the A.C. operational amplifier. The D.C. to A.C. inverter 90 generates auxiliary square wave signals used for the sychronous demodulator, which will be explained later on. Points C and D of the bridge circuit are connected to an indicating means, after first being processed by an A.C. operational amplifier which amplifies the unbalanced A.C. signal appearing across these terminals. A perfectly balanced bridge will cause the A.C. operational amplifier to have zero output; therefore the indicating device 96 will have zero deflection and be centered on the scale. Any unbalance in the bridge circuit caused by changes in resistance of the strain gage elements will cause the A.C. operational amplifier 92 to have an output. This in turn is demodulated by the synchronous demodulator 94 and fed to the indicating device 96. The indicating device 96 may either be calibrated in pounds or any convenient measuring scale. However, in the present embodiment, the indicating device is reset to zero by mechanically balancing the bridge using an auxiliary readout device to indicate the weight of the material being measured. The ends of the resistance element of a first or bridge-balancing potentiometer 98 are connected to points A and B of the bridge circuit and the slider 100 of the potentiometer 98 is connected to point C of the bridge circuit. This potentiometer is used to balance the bridge under the initial or start condition and will automatically subtract the weight of the material-receiving media. The ends of the resistance element of the second or readout potentiometer 102 are connected to points A and B of the bridge circuit and the slider of the potentiometer 104 is connected to point D of the bridge circuit. A counter 106 is mechanically connected by rotation transmitting elements 108 and 110 between which is rotation multiplying device 111, such as a gear box. The rotation-multiplying device 111 is arranged to rotate the shaft of the counter 106 to a greater angular displacement than that through which the shaft of the readout potentiometer 102 is adjustably rotated.

The bridge as diagrammed in FIG. 6 in the preferred embodiment is excited or energized by an A.C. voltage of 12 v. A.C. at 1000 Hz. which is produced from an inverter 90 whose excitation in turn is derived from a D.C. source such as the vehicle storage battery or an auxiliary battery incorporated within the housing for the operational amplifier, demodulator, and indicating device, as well as the counter.

The electronic circuitry is all of the solid state type using a maximum of miniature integrated semi-conductor modules.

Figure 7:
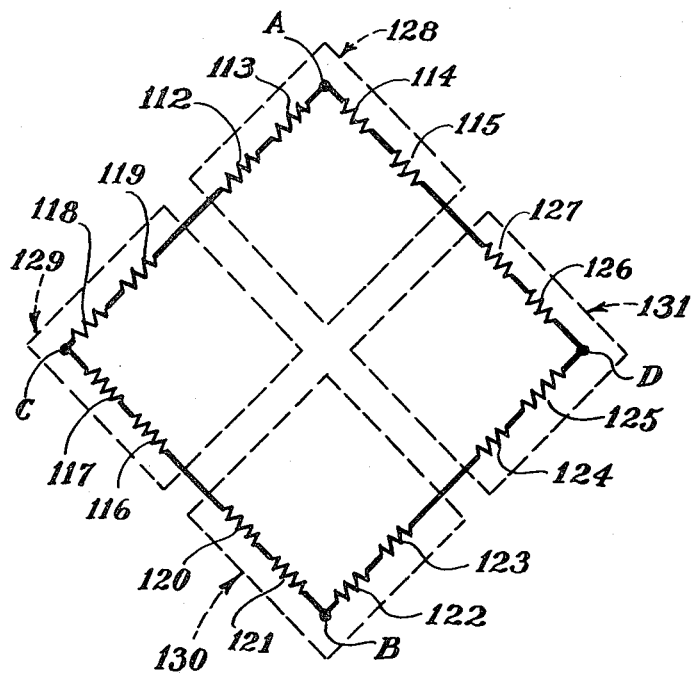
FIG. 7 is a schematic diagram of the measuring bridge circuit showing the incorporation of the necessary strain gage sensors to measure the weight of material in four load-bearing members.

FIG. 7 illustrates a modification of the bridge circuit utilized in FIG. 6, wherein four load-sensing gages have been incorporated. It is to be understood that four load-sensing gages need not be utilized. When less than four gages are utilized, a dummy resistance network is substituted to complete the bridge network, thereby enabling the bridge to be balanced. Additional load-sensing gages may be incorporated and connected in the proper manner in the respective arms of the bridge, Gages 112, 113, 114 and 115 are the four elements which would be utilized on one load-bearing member. These gages correspond to items 116, 117, 118 and 119, which are the load-sensing gages appearing on another load-bearing member. Similarly, gages 120, 121, 122, 123 would appear on an additional load-bearing member. Likewise gages 124, 125, 126, 127 would appear on the fourth load-bearing member if the vehicle or stationary container were supported by four load-supporting members. It is to be pointed out again that if less than four load-supporting members are used, the only requirement is that a dummy sensing network be utilized to replace the gages not utilized.

Each axle of the vehicle, therefore, would contain the four gages encompassed in the dotted lines and numbered 128, 129, 130 and 131.

One method af calibrating the strain gages to be used in the load-carrying members of various vehicles is to vary the distance $D_2$ between the gages when affixed to the load-bearing member and design the gages to have a predetermined resistance value. This enables one indicating device to be used for many different vehicles regardless of whether they are of the three or four load member bearing type, or whether they are fixed containers or vehicular-mounted containers. Each gage will have the same sensitivity regardless of tare weights.

This technique, therefore, will enable vehicles of different tare weights, which would cause different output readings on the various strain gages, to be adjustable to the correct output value. Thus the sensitivity of all strain gage sensors would be identical and the indicating device could be interchanged or used to measure the contents of various types of containers. All system components used in the bridge will have the same effective impedance thus avoiding the necessity for individually calibrating each system each time it is used.

OPERATION OF THE CIRCUIT

Some further explanation of the functions and characteristic of certain of the elements and components shown in circuit diagram, FIG. 6, are desirable here.

The balancing potentiometer 98 (manually settable) is used when it is desired to balance out the initial weight or some predetermined weight to obtain a zero reading on the counter 106.

The readout potentiometer 102 (manually settable) is used to obtain a null indication so that the counter (preferably of the Veeder-Root or equivalent type), will indicate the weight on cyclometer-type dials or the equivalent.

Synchronous demodulator 94 converts an A.C. signal to a D.C. signal. The D.C. null indicator 96 may be an instrument such as a galvanometer.

The gear box 111 multiplies the angular displacements of the readout potentiometer shaft and its movement is directly related to the increase in weight of the material in the container. With the material-receiving medium empty, the readout potentiometer 98 is adjusted for the count on the readout 106 to be on zero, then the balancing potentiometer 98 is adjusted to bring the pointer of the null indicator 96 into alignment center, that is zero on the indicator scale. This operation balances out the weight of the receiving medium and all parts of the vehicle supported by members equipped with strain gages. The readout potentiometer 102 is then adjusted to cause the counter 106 to indicate the weight of material which the user wishes to place in the receiving medium. The null indicator will then have an indication other than zero. Material is then incrementally placed in the receiving medium until the null indicator shows a zero reading at which time the weight of the material in the receiving medium is, as indicated by the counter, a desired weight. A second and different material may be added by using either of the two following methods for operating the eqiupment, to wit:

METHOD 1

The readout potentiometer 102 is adjusted to indicate the combined weight of the originally deposited material plus the desired weight of the material to be added. The null indicator 96 will then display a reading other than zero. A second material is incrementally added until the null indicator presents a zero reading, at which time the desired weight of the second material will have been added. Similarly the desired weight of a third material may be added.

METHOD 2

The balancing potentiometer 98 is adjusted to obtain a zero reading on the null indicator 96 and the readout potentiometer 102 is then adujsted to cause the counter 106 to indicate the weight of the material to be added. The second material is incrementally added until the null indicator presents zero reading at which time the desired weight of the second material will have been added. Similarly the desired weight of a third material may be added.

A similar method may be used to determine the amount of material being expended from a container.

From the foregoing disclosure it will be seen that I have provided a new and improved electromechanical weighing system which is adapted for wide general use related to the support of various material-receiving media and preferably to a plurality of critical load points. It is applicable to bins and other storage receivers wherein solid and liquid materials are at intervals successively deposited and it is particularly applicable to material receivers mounted for travel on wheels, tracks, runners or other ground-engaging supporting means. My invention and novel concepts are of great value for appliaction to receivers which are adapted to intimately admix predetermined quantities of different materials (solid, granular or liquid) and where said different materials are successively and at intervals deposited in the receiving medium.

It is also to be realized this system may be utilized for measuring the expenditure or disposition of materials in a container as well. It will further be seen that numerous types of vehicles supported by axles, or by the equivalent, and upon ground-engaging elements such as tracks, wheels, skids, or the like, replaceable axle and axle-support structures may be readily applied as a replacement for the original axle structure without requiring a change in wheels or other ground-engaging supporting elements, and without requiring reformation of the base or body material-receiving medium. It will be further seen that the system and method by which cumulative and successive weight information is derived is unique because of its great simplicity as contrasted with prior art devices. All of the components, electrical and mechanical, of my system with the exception of the pairs of strain gages which are bonded onto the cantilevered elements may be assembled very compactly in a small capsule mounted at any convenient point upon the material-receiving body or its frame, or may be remotely located if so desired.

What is claimed is:

1. A weight-responsive coupling device for draft connection of a propulsion vehicle with a towed vehicle of the type having a pair of axially aligned ground-engaging elements supporting and connected with a load-receiving container and further equipped with an electromechanical load-weighing means which include electrical strain gage elements responsive respectively to component load variations imposed upon each of said ground-engaging elements, said propulsion vehicle having a rigid draft connection element affixed to one end thereof and said towed vehicle having a draft connection element affixed to one end thereof, said coupling device comprising a substantial horizontal, elastic, weight-bendable member having one of its end portions rigidly affixed to one of said draft connection elements and extending outwardly therefrom longitudinally of the coupled vehicle, and having a second end portion connected to the second draft connection element and mounted for oscillation on a substantially horizontal axis extending longitudinally thereof, an electrical strain gage element affixed to said elastic element and extending longitudinally thereof between the said connections of the end portions of said elastic element with said draft connection elements, and means for electrically connecting said strain gage with circuitry of said weighing means of said towed vehicle for interposing as a factor in measurement of overall load-weight reposing in said container, that proportion of weight superimposed on said coupling.

2. The structure and combination set forth in claim 1 wherein a second electrical strain gage element is mounted on said elastic element extending longitudinally thereof and on a surface thereof disposed oppositely from the surface on which said first strain gage element is mounted.

3. The structure and combination set forth in claim 1 wherein said recited strain gage constitutes one of a pair of substantially horizontally aligned strain gages mounted in predetermined spaced relation on an upper longitudinal surface of said elastic element.

4. The structure and combination set forth in claim 1 wherein the first-mentioned end portion of said weight-bendable member overlies and is supported by its associated draft connection element and the body thereof extends outwardly from said rigid connection, and wherein the second end portion of said weight-bendable member overlies and is supported by said second draft connection element.

5. The structure and combination set forth in claim 1 wherein said elastic, weight-bendable member is substantially straight in configuration and has its end portion connected for axial oscillation with its associated draft connection element also supported upon said associated draft connection element.

6. The structure and combination set forth in claim 5 wherein the portion of said elastic element between its terminal connections with said two draft connection elements and upon which said strain gages are mounted constitutes predominantly the weight-bendable composition of said elastic element.

7. In a system for electromechanically and successively weighing loads delivered to a material-receiving container which is mounted and supported at a plurality of load area points upon at least a pair of axially aligned ground-wheel units and which is also partially supported by a coupling draft connection with a propulsion vehicle, said system having in combination for each of said pair of aligned ground-wheel units, (a) a generally horizontal elastic, weight-bendable axle element having one of its end secured to said container and having another end connected with one of said wheels, (b) an upstanding, relatively non-deformable load-supporting means closely surrounding said elastic member adjacent the said rigidly secured end thereof, (c) means for rigidly securing said upstanding load-supporting means to a side portion of said material-receiving container, (d) at least a pair of cooperating, electrical strain gages affixed in horizontally spaced relation to each of said elastic axle elements between the end connection thereof with said wheels and upstanding member, said strain gages having known electrical parameters which vary in known manner in response to varying deformations of said elastic elements as produced by weight variations imposed thereon by said upstanding load supports, (e) said coupling draft connection between said towed vehicle and said propulsion vehicle having in combination a draft element rigidly connected with one end of the propulsion vehicle and a second draft element rigidly connected to said load container, (f) an elastic, generally horizontal weight-bendable member having an end portion rigidly connected with one of said draft elements and having a second end portion connected for oscillation on a horizontal axis extending longitudinally of said vehicles with said second draft element, (g) a pair of electrical strain gages affixed in predetermined, horizontally spaced relation to the intermediate portion of said elastic member, (h) and electrical connections between said strain gages and circuitry which includes the strain gages affixed to the elastic element connected with said wheels together with a source of electricity and means for amplifying and indicating variance in material loads reposing in said container.

8. The structure and combination set forth in claim 7 wherein the elastic, weight-bendable member of said coupling draft connection is of substantially straight configuration and solid in form and wherein the said end portions of said elastic member overlie and are supported upon portions of the said respective draft elements.

9. A weight-responsive coupling device for interconnecting two spaced, ground-engaging supporting structures, one of said structures comprising at least a pair of ground-engaging units interconnected with predetermined load points of a load-receiving container, the said interconnections constituting elastic weight-deformable elemets having electrical strain gage medias affixed thereon and connected electrically in a circuit for amplifying variances in said strain gages and proportionately indicating variances in a weight-indicating medum, the second supporting structure having a support connection element disposed above ground level, said coupling device comprising a generally horizontal elastic, weight-bendable member having an end portion connected with said last-mentioned support connection element and having another end supportingly connected with said load-receiving container, the connection of one end portion of said generally horizontal elastic member being oscillatable on a substantially horizontal axis extending longitudinally of said member, and strain gage means affixed to said generally horizontal elastic member and interconnected with said previously recited circuit to interpose as a factor in measurement of overall load weight, that proportion of said weight superimposed on said coupling.

10. The structure and combination set forth in claim 9 wherein two predominately spaced strain gage elements are mounted on said elastic element extending longitudinally thereof and positioned between said connected ends of said element.

11. The structure and combination set forth in claim 9 wherein said elastic, weight-bendable member is substantially straight in configuration and has its end portion connected for axial oscillation also supported upon said associated draft connection element.

12. The structure and combination set forth in claim 11 wherein the portion of said elastic coupling element between its terminal connections with said two connection elements and upon which said strain gage means is mounted constitutes predominately the weight-bendable composition of said elastic element.

References Cited
UNITED STATES PATENTS

| | | | |
|---|---|---|---|
| 2,601,781 | 7/1952 | Fillion | 73—141 A |
| 3,084,297 | 4/1963 | Glerum | 73—141 AX |
| 3,273,382 | 9/1966 | Fonash | 177—136 X |
| 3,283,838 | 11/1966 | Fetterman et al. | 177—136 X |
| 3,443,652 | 5/1969 | Videon | 177—136 |
| 3,576,128 | 4/1971 | Lockery | 73—141 AX |

FOREIGN PATENTS

| | | | |
|---|---|---|---|
| 980,927 | 5/1951 | France | 73—141 A |

STEPHEN J. TOMSKY, Primary Examiner

G. H. MILLER, Jr., Assistant Examiner

U.S. Cl. X.R.

177—229